Patented July 12, 1932

1,867,088

UNITED STATES PATENT OFFICE

ANTON OSSENBECK, OF COLOGNE-MULHEIM-ON-THE-RHINE, AND ERNST TIETZE, OF COLOGNE-ON-THE-RHINE, GERMANY, ASSIGNORS TO GENERAL ANILINE WORKS, INC., OF NEW YORK, N. Y., A CORPORATION OF DELAWARE

NEW WATER SOLUBLE DIAZO AMINO COMPOUNDS

No Drawing. Application filed January 20, 1930, Serial No. 422,214, and in Germany January 23, 1929.

The present invention relates to new water soluble diazo amino compounds, more particularly to compounds of the probable general formula

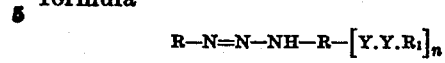

wherein the R's and $R_1$ represent residues of the benzene or naphthalene series, one Y means the group $SO_2$ and the other Y the group NH, and $n$ stands for one of the numbers 1 or 2.

The new compounds are obtainable by causing to react upon each other, advantageously in about molecular quantities, a diazonium compound obtainable in the usual manner from a primary aromatic amine, and a sulfamide of the probable general formula:

$$H_2N-R-[Y.Y.R_1]_n$$

wherein R, $R_1$, the Y's and $n$ have the above indicated meaning.

The sulfamides of the general formula:

$$H_2N-R-[NH.SO_2.R_1]_n$$

wherein R, $R_1$ and $n$ have the above indicated meaning, are obtainable by condensing an aromatic mono- or di-amino-nitro compound with one or two molecules, respectively, of an aromatic sulfochloride and reducing the nitro compound thus formed. The reactions involved may be illustrated by the general scheme:

wherein R, $R_1$ and $n$ are identified as above.

The sulfamides of the general formula:

$$H_2N-R-[SO_2.NH.R_1]_n$$

wherein R, $R_1$ and $n$ have the above signification, may be prepared by condensing an aromatic nitro-mono- or di-sulfochloride with one or two molecules, respectively, of an aromatic amine and reducing the nitro compound thus formed to the corresponding amino compound. The reactions may be illustrated by the schematic equations:

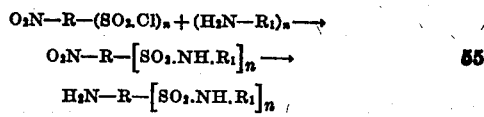

wherein R, $R_1$ and $n$ have the above indicated meaning.

As sulfamides falling within the scope of the general formulae indicated above, there may be mentioned by way of example: 4-amino-1-methylbenzene-2-sulfanilide of the formula:

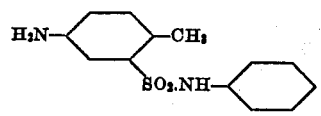

4-methyl 1-aminobenzene-3-sulfamide:

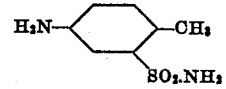

1-amino-2.4-di-[phenylsulfamino]-benzene:

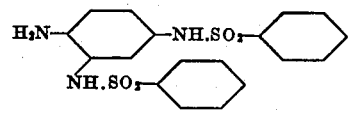

or such sulfamides of the benzene series in which the benzene nuclei are substituted by monovalent substituents, such as alkyl groups, nitro groups, alkoxygroups, halogen atoms, or the like, or also such sulfamides of the above general formula in which R or $R_1$ stand for substituted or unsubstituted naphthalene nuclei.

Our new products are prepared, for example, by diazotizing in the usual manner an aromatic amine with sodium nitrite and hydrochloric acid, adding the diazo solution to a hydrochloric acid solution of the sulfamide and neutralizing the solution.

Any desired kind of diazotizable aromatic amines can be used for this process, for example 2.5 - dichloro - 1 - amino - benzene, 4 - chloro - 2 - amino - 1 - methylbenzene, 4.5-dichloro-2-amino-1-methylbenzene, 5-nitro-2-amino-1-methylbenzene, 3-chloro-1-aminobenzene, 4 - chloro - 2 - amino-1-methoxybenzene, 4-nitro-2-amino-1-methoxybenzene, 3-amino-4-methoxy-6-nitro-1-methylbenzene, 3-amino-4-methoxy-6-benzoylamino-1-methylbenzene, 6-amino-3-benzoylamino-4-ethoxy-1-methoxybenzene, α- or β-naphthylamine or nuclear substitution products thereof, 4-nitro-4'-amino-2'.5'-dimethoxy-azobenzene and the like.

The products thus obtainable which probably correspond to the general formula mentioned above form yellowish to yellow-brown compounds, rather difficultly soluble in the usuable organic solvents, soluble in alkalies, being split up into their components by acids, especially easily by mineral acids.

The following examples illustrate our invention without limiting it thereto:—

*Example 1.*—The diazo compound from 127.5 parts by weight of 3-chloro-aniline is allowed to run into a hydrochloric acid solution of 262 parts by weight of 4-amino-1-methylbenzene-2-sulfanilide of the formula:

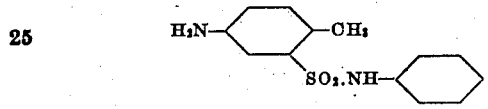

and the reaction to Congo red is gradually caused to disappear by the addition of sodium acetate or sodium carbonate. After a few hours the diazo compound is no longer detectable, and the diazoamino compound of the formula

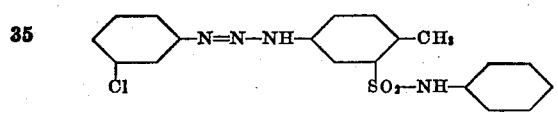

separates. The latter is dissolved in caustic soda lye and salted out with sodium chloride, whereupon the sodium salt first separates in the form of a resinous mass. After filtering and drying it forms a yellowish brown powder readily soluble in water, the solution being readily split up again by acids into the initial components.

*Example 2.*—On replacing the 3-chloroaniline (in Example 1.) by the equivalent quantity of 2.5-dichloro-aniline there is obtained a product of the formula:—

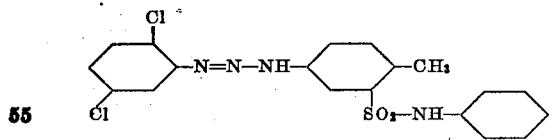

possessing completely analogous properties.

*Example 3.*—140 parts by weight of 4-nitroaniline are diazotized in the customary manner with 69 parts by weight of sodium nitrite in hydrochloric acid solution. The solution of the diazonium salt is then allowed to run into a hydrochloric acid solution of 4-amino-2-[phenylsulfamino]-1-methyl-benzene and worked up in the manner indicated in Example 1. The diazoamino compound of the formula:

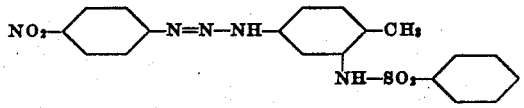

is thus obtained in the form of a brownish powder, soluble in water.

*Example 4.*—In a similar manner as described in the above examples there is formed the diazo amino compound from 2-methyl-4-nitro-1-benzene diazoniumchloride and 1-amino-2.4-di-[phenylsulfamino]-benzene of the formula:

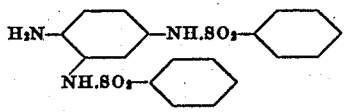

obtainable by reacting with benzenesulfochloride upon 1-nitro-2.4-phenylendiamine and reduction. The product formed has the probable formula:

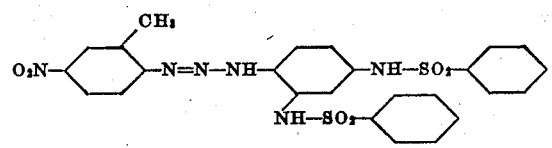

We claim:—

1. As new products, the compounds of the probable formula

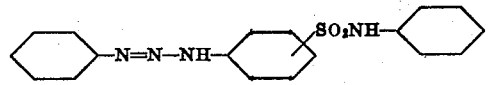

wherein the benzene nuclei may be substituted by monovalent substituents of the group consisting of alkyl, alkoxy, nitro and halogen, said products forming yellowish to yellow brown compounds, rather difficultly soluble in the usual organic solvents, soluble in alkalies, and being easily split up by acids.

2. As a new product, the compound of the probable formula

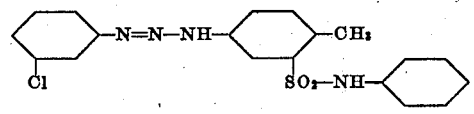

said product being in the form of its sodium salt a yellowish brown powder, readily soluble in water, and being split up by acids.

3. As new products, the compounds of the probable general formula:

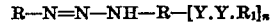

wherein the R's and $R_1$ represent residues of the benzene or naphthalene series, one Y means the group $SO_2$ and the other Y the group NH, and $n$ stands for one of the numbers 1 or 2, said products forming yellowish to yellow-brown compounds, being rather difficultly soluble in the usual organic solvents, soluble in alkalies, and being easily split up by acids.

4. As new products, the compounds of the probable general formula:

$$R-N=N-NH-R-Y.Y.R$$

wherein the R's stand for residues of the benzene series, one Y represents the group $SO_2$ and the other Y the group NH, said products forming yellowish to yellow-brown compounds, being rather difficultly soluble in the usual organic solvents, soluble in alkalies, and being easily split up by acids.

5. As a new product, the compound of the probable formula:

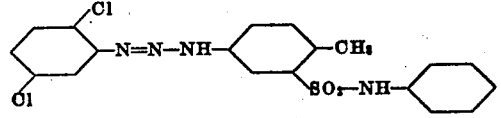

said product being in the form of its sodium salt a yellowish brown powder, readily soluble in water, and being split up by acids.

In testimony whereof, we affix our signatures.

ANTON OSSENBECK.
ERNST TIETZE.